United States Patent
Kim

(10) Patent No.: US 8,938,868 B2
(45) Date of Patent: Jan. 27, 2015

(54) SPRING TUBE WINDING MACHINE

(75) Inventor: Jong hun Kim, Daegu (KR)

(73) Assignee: Sunjin Precision Co., Ltd., Daegu (KR)

( * ) Notice: Subject to any disclaimer, the term of this patent is extended or adjusted under 35 U.S.C. 154(b) by 264 days.

(21) Appl. No.: 13/520,127

(22) PCT Filed: Dec. 30, 2010

(86) PCT No.: PCT/KR2010/009548
§ 371 (c)(1),
(2), (4) Date: Jun. 29, 2012

(87) PCT Pub. No.: WO2011/081469
PCT Pub. Date: Jul. 7, 2011

(65) Prior Publication Data
US 2012/0273604 A1     Nov. 1, 2012

(30) Foreign Application Priority Data

Dec. 30, 2009 (KR) .......................... 10-2009-0133929

(51) Int. Cl.
*B31C 1/00* (2006.01)
*B21C 37/06* (2006.01)
(Continued)

(52) U.S. Cl.
CPC .............. *B65H 39/00* (2013.01); *B21C 37/154* (2013.01); *B29C 53/58* (2013.01)
USPC ...................... 29/33 D; 29/895.211

(58) Field of Classification Search
CPC ........... B60G 2206/12; B60G 2206/42; B60G 2206/422; B60G 2206/4222; B60G 2206/8109; B60G 2206/80; B31C 1/00; B21C 37/06
USPC .......... 29/33 D, 33 T, 895.2, 895.21, 895.211
See application file for complete search history.

(56) References Cited

U.S. PATENT DOCUMENTS 3,013,920 A * 12/1961 Harris et al. ................... 156/194
3,794,538 A *  2/1974 Christie et al. ................ 156/187
(Continued)

FOREIGN PATENT DOCUMENTS

JP     2007-091390 A    4/2007
KR    10-2001-0009665 A  2/2001
(Continued)

*Primary Examiner* — David Bryant
*Assistant Examiner* — Jason L Vaughan
(74) *Attorney, Agent, or Firm* — Novick, Kim & Lee, PLLC; Jae Youn Kim

(57) ABSTRACT

Disclosed therein is a spring tube winding machine including: a winding roller (10) formed in a cylindrical shape to wind a first rubber sheet (T1), a first code topping paper (C1), a second code topping paper (C2) and a second rubber sheet (T2), which are the spring tube materials, in order, the winding roller (10) including an uneven portion (12) formed on the outer circumferential surface thereof, a nozzle (14) disposed at an end for injecting compressed air, and a plurality of discharge holes (16) for ejecting compressed air injected through the nozzle (14) outwardly from the inside; and a table (20) having a reference line (22) for setting a seating angle in such a fashion that the spring tube materials wound on the winding roller (10) are seated in an unfolded state and the codes (C) embedded in the first code topping paper (C1) and the second code topping paper (C2) are intersected with each other. The spring tube materials are seated at correct positions and wound on the winding roller through the reference lines marked on the table so as to be exactly arranged at the preset code intersection angle, and so, the spring tube winding machine can keep even quality of the spring tube and even buffering force. Moreover, the spring tube winding machine enables the spring tube materials to be easily removed from the winding roller after completion of the stacking and winding process because the discharge hole is formed to spray the compressed air in the outward direction from the inside.

6 Claims, 3 Drawing Sheets

(51) Int. Cl.
    *B65H 39/00*     (2006.01)
    *B21C 37/15*     (2006.01)
    *B29C 53/58*     (2006.01)

(56) References Cited

U.S. PATENT DOCUMENTS

| | | | | |
|---|---|---|---|---|
| 3,802,639 | A | * | 4/1974 | Dowd, Jr. ................ 242/533 |
| 4,673,168 | A | * | 6/1987 | Warmuth et al. ......... 267/64.27 |
| 4,769,747 | A | * | 9/1988 | Parrillo ................... 362/89 |
| 6,102,096 | A | * | 8/2000 | Johansson et al. ........ 156/353 |
| 6,513,751 | B2 | * | 2/2003 | Michel ..................... 242/571.1 |
| 6,719,279 | B1 | * | 4/2004 | Koch et al. ............... 267/64.27 |
| 6,723,036 | B2 | * | 4/2004 | Weaver et al. ............ 493/450 |

FOREIGN PATENT DOCUMENTS

| | | |
|---|---|---|
| KR | 10-2001-0113995 A | 12/2001 |
| KR | 10-2003-0034792 A | 5/2003 |
| KR | 20-0389000 Y1 | 7/2005 |

\* cited by examiner

SPRING TUBE WINDING MACHINE

TECHNICAL FIELD

The present invention relates to a spring winding machine, and more particularly, to a spring tube winding machine that can stack and arrange spring tube materials in which cords are embedded, at correct angles.

BACKGROUND ART

In general, a spring tube is a core component for an air suspension system and serves to reduce a damage of a car body and provide a comfortable ride to a passenger by connecting a car axle and the car body with each other by pneumatic pressure to thereby properly reduce vibration or shock transferred from the surface of the road during drive, so as to adjust a buffer power according to drive conditions and provide smoother feeling of drive by adjusting pneumatic pressure.

Moreover, the spring tube is mounted between a lower housing fixed to the car axle and an upper housing fixed to the car body, and provides buffering action by being filled with compressed air. Here, the spring tube is manufactured through the steps of inserting spring tube materials, which are stacked in multiple layers, into a melting machine and performing compression molding at high temperature, and in this instance, the spring tube is determined in buffering force and product quality by cords arranged inside in a mesh form.

However, the stacking and winding process of the spring tube materials depends on a worker's skill level, and hence, it makes a great difference in buffering force and product quality of the spring tube because an intersection angle of the cords is not exactly arranged at a preset angle.

Moreover, in order to wind the spring tube materials into a cylindrical form, a plurality of spring tube materials are stacked and wound in order on a winding roller, and the stacked and wound spring tube materials are separated from the winding roller, and are transferred to the high-temperature melting process. In this instance, the stacked and wound spring tube materials get in close contact with the winding roller, and hence, they are not easily separated even after the stacking and winding process is finished. Accordingly, when the worker forcedly pulls and separates the spring tube materials, the arranged angle of the spring tube materials is varied, and it causes poor quality of products,

DISCLOSURE

Technical Problem

Accordingly, the present invention has been made in an effort to solve the above-mentioned problems occurring in the prior arts, and it is an object of the present invention to provide a spring tube winding machine, which can correctly arrange a cord intersection angle of spring tube materials at a preset angle during stacking and winding work, and easily separate the spring tube materials from a winding roller after the stacking and winding process.

Technical Solution

To achieve the above objects, the present invention provides a spring tube winding machine including: a winding roller formed in a cylindrical shape having an uneven portion (12) formed on the outer circumferential surface thereof, so that the winding roller (10) winds spring tube materials, which are a first rubber sheet (T1), a first cord topping sheet (C1), a second cord topping sheet (C2) and a second rubber sheet (T2), in order, the winding roller (10) including a plurality of discharge holes (16) for ejecting compressed air injected through a nozzle (14), which is disposed at an end of the winding roller (10), in the outward direction from the inside; and a table having a reference line for setting a seating angle in such a fashion that the spring tube materials wound on the winding roller are seated in an unfolded state and the cords embedded in the first cords topping sheet and the second cord topping sheet are intersected with each other.

In this instance, the reference lines are formed in a set of a pair at a position where they are symmetric at an angle of 45 to 65 degrees.

Moreover, at least two kinds of the reference lines are indicated at different inclination angles and have different colors.

Furthermore, the discharge hole includes an inclined hole formed in such a fashion that the compressed air is discharged in a direction that the wound spring tube materials are removed.

Advantageous Effects

According to the present invention, the spring tube materials are seated at correct positions and wound on the winding roller through the reference lines marked on the table so as to be exactly arranged at the preset cord intersection angle, and so, the present invention can keep even quality of the spring tube and even buffering force. Moreover, the present invention enables the spring tube materials to be easily removed from the winding roller after completion of the stacking and winding process because the discharge hole is formed to spray the compressed air in the outward direction from the inside.

MODE FOR INVENTION

Reference will be now made in detail to the preferred embodiment of the present invention with reference to the attached drawings.

Figure 1:
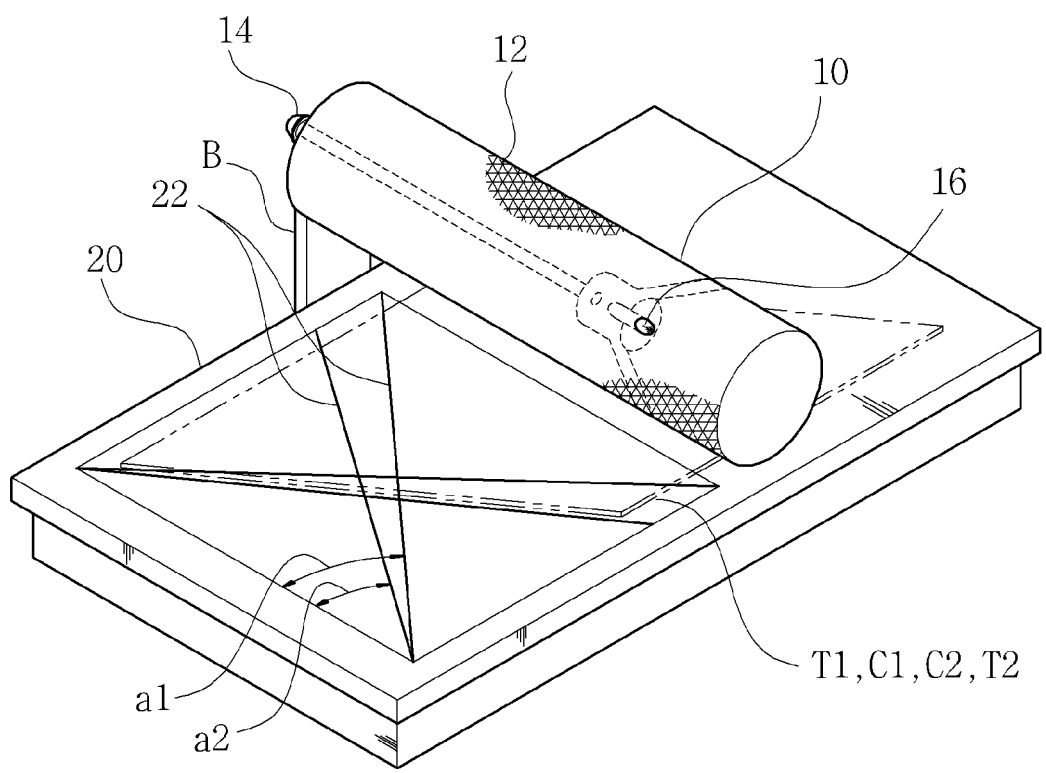
FIG. 1 is a configurative view of a spring tube winding machine according to the present invention.
Figure 2:
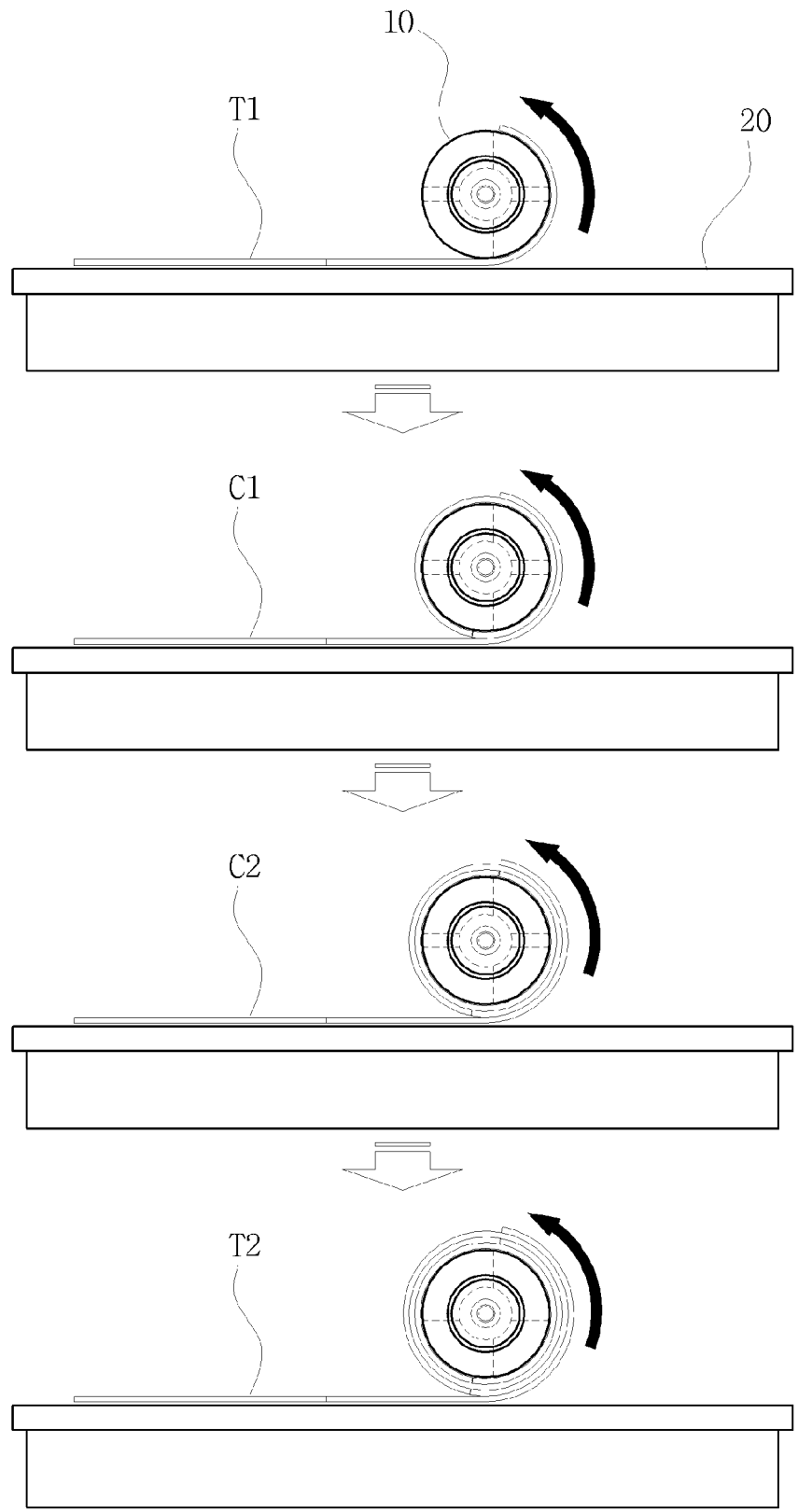
FIG. 2 is a configurative view showing a state where a spring tube material is wound using the spring tube winding machine according to the present invention.
Figure 3:
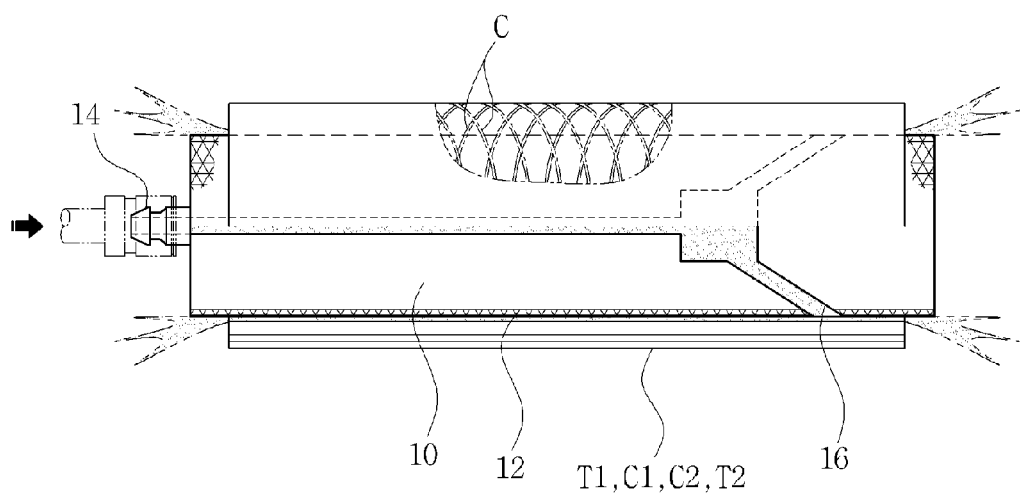
FIG. 3 is a configurative view of a winding roller of the spring tube winding machine.

FIG. 1 is a configurative view of a spring tube winding machine according to the present invention, FIG. 2 is a configurative view showing a state where a spring tube material is wound using the spring tube winding machine according to the present invention, and FIG. 3 is a configurative view of a winding roller of the spring tube winding machine.

The present invention relates to a spring tube winding machine. The spring tube winding machine includes a winding roller 10 and a table 20, which are provided to correctly arrange previously prepared first and second rubber sheets T1 and T2 and first and second topping sheets C1 and C2 at an intersection angle of a mesh form, in which cords C are preset, when they are wound on the winding roller 10 and to easily separate spring tube materials from the winding roller 10 after completion of the winding work.

The winding roller 10 according to the present invention is formed in a cylindrical shape having an uneven portion 12 formed on the outer circumferential surface thereof, so that the winding roller 10 winds spring tube materials, which are a first rubber sheet T1, a first cord topping sheet C1, a second cord topping sheet C2 and a second rubber sheet T2, in order, and includes a plurality of discharge holes 16 for ejecting compressed air injected through a nozzle 14, which is disposed at an end of the winding roller 10, in the outward direction from the inside.

To wind the first rubber sheet T1, the first cord topping sheet C1, the second cord topping sheet C2 and the second rubber sheet T2, which are the spring tube materials, in order. The winding roller 10 includes an uneven portion 12 formed on the outer circumferential surface thereof, a nozzle 14 disposed at an end for injecting compressed air, and a plurality of discharge holes 16 for ejecting compressed air injected through the nozzle 14 outwardly from the inside.

The winding roller 10 is made of lightweight and easily processable material including synthetic resin. The uneven portion 12 formed on the outer circumferential surface of the winding roller 10 has a lattice pattern so as to rapidly interfuse the compressed air, which is injected through the discharge hole 16, between the winding roller 10 and the spring tube materials.

After the winding process, when the compressed air is injected through the nozzle, while the compressed air is evenly dispersed along the discharge hole 16 and the engraving portion, the spring tube materials are pneumatically floated on the winding roller 10, and hence, the spring tube materials can be easily separated.

Moreover, a plurality of the discharge holes 16 are formed at even equal angles to communicate with the nozzle 14, and inclined holes are formed in such a fashion that compressed air is discharged in a direction that the wound spring tube materials are separated. That is, as shown in FIG. 3, the discharge holes 16 are formed at an inclination angle ranging 30 degrees to 50 degrees relative to a central axis of the winding roller 10, so that the compressed air is sprayed at the inclination angle along the discharge holes 16 and the spring tube materials wound on the outer circumferential surface of the winding roller 10 are naturally pushed and separated.

In the meantime, the winding roller 10 is detachably mounted through a support bar B disposed at an end of the table 20, which will be described later, and hence, is detached to be used during the winding work, but after completion of the winding work, the spring tube materials are separated in a state where winding roller 10 is attached to the support bar B.

Furthermore, the table 20 according to the present invention includes a reference line 22 for setting a seating angle in such a fashion that the spring tube materials wound on the winding roller 10 are seated in an unfolded state and the cords C embedded in the first cords topping sheet C1 and the second cords topping sheet C2 are intersected with each other. The table 20 is formed in a plate type having a flat upper face, and end portions of the first and second cords topping sheets C1 and C2 are seated in such a way as to correspond to the reference line 22, so that the cords C embedded in the first and second cord topping sheets C1 and C2 are intersected with each other in the mesh form. Here, the reference lines 22 are formed in an intaglio line on the upper face of the table 20 or have colors different from the table 20 so as to be easily discernible during the winding work.

In this instance, the reference lines 22 are formed in a set of a pair at a position where they are symmetric at an angle of 45 to 65 degrees. The reason is to intersect and arrange the first and second cord topping sheets C1 and C2 into the mesh form. For an example, when the cord C of the first cord topping sheet C1 is located at an angle of 50 degrees, the cord C of the second cord topping sheet C2 must be located at an angle of −50 degrees, and hence, a set of the reference lines 22 of the same angle as shown in FIG. 1 are located at symmetric positions.

Furthermore, at least two kinds of the reference lines 22 are indicated at different inclination angles a1 and a2, and have different colors. The spring tube is determined in its buffering force by the intersection angle of the cords C, and hence, in order to simply vary the intersection angle of the cords C according to kinds of vehicles and requirements to which the present invention is applicable, a plurality of reference lines 22 are indicated at an angle equivalent to the corresponding buffering force and different colors are indicated so that each of the reference lines 22 are discernible, whereby the present invention has a merit to rapidly and correct change work when a winding angle of the first and second cord topping sheets C1 and C2 is changed.

In use, a shown in FIG. 2, after the first rubber sheet T1 is seated on the table 20, the winding roller 10 is rotated so that the first rubber sheet is wound in a circular form, and then, the first cord topping sheet C1 is seated on one of the reference lines 22 of the table 20 and the winding roller 10 is rotated so that the first cord topping sheet C1 is wound on the outer circumferential surface of the first rubber sheet T1. After that, when the second cord topping sheet C2 is seated on the other reference line 22 and the winding roller 10 is rotated, the cord C of the first and second cord topping sheets C1 and C2 are intersected with each other into the mesh form. Continuously, when the second rubber sheet T2 is seated on the table 20 and the winding roller 10 is rotated, the winding work is finished.

After completion of the winding work of the first and second rubber sheets T1 and T2 and the first and second cord topping sheets C1 and C2, when compressed air is injected via the nozzle 14, while the compressed air is injected between the outer circumferential surface of the winding roller 10 and the inner circumferential surface of the spring tube material along the uneven portion 12 through the discharge hole 16, the wound spring tube materials are pneumatically floated, so that they can be easily removed from the winding roller 10.

In the meantime, in order to evenly act the buffering force by the cords C to the entire of the outer circumferential surface of the spring tube, it is preferable that the winding of the first and second cord topping sheets C1 and C2 is carried out at equal angles of 180 degrees.

The invention claimed is:

1. A spring tube winding machine comprising:
   a winding roller formed in a cylindrical shape having an uneven surface on the outer circumferential surface thereof, so that the winding roller is configured to wind spring tube materials, which include a first rubber sheet, a first cord topping sheet, a second cord topping sheet and a second rubber sheet, in order, the winding roller including a plurality of discharge holes for ejecting compressed air injected through a nozzle, which is disposed at an end of the winding roller, in an outward direction from an inside; wherein the first cord topping sheet comprises a first plurality of cords, and the second cord topping sheet comprises a second plurality of cords; and
   a table having a plurality of pairs of reference lines with different angles on a surface of the table, each pair of reference lines comprising a first reference line and a second reference line intersecting each other at a point and symmetric with each other with respect to a line including the point and perpendicular to the longitudinal axis of the winding roller for setting a seating angle in such a fashion that the spring tube materials wound on the winding roller are seated in an unfolded state and the first plurality of cords and the second plurality of cords are intersected with each other.

2. The spring tube winding machine according to claim 1, wherein each of the pair of reference lines is provided with a different degree of angle has different color.

3. The spring tube winding machine according to claim 2, wherein the discharge hole comprises an inclined hole formed in such a fashion that the compressed air is discharged in a direction that the wound spring tube materials are removed.

4. The spring tube winding machine according to claim 1, wherein the discharge hole comprises an inclined hole formed in such a fashion that the compressed air is discharged in a direction that the wound spring tube materials are removed.

5. The spring tube winding machine according to claim 1, an angle between a longitudinal axis of the winding roller and at least one of the first reference line and the second reference line are in a range of 45 to 65 degrees.

6. The spring tube winding machine according to claim 1, the uneven surface comprises a lattice pattern configured to rapidly interfuse the compressed air between the winding roller and the spring tube materials.

\* \* \* \* \*